(12) United States Patent
Takahashi et al.

(10) Patent No.: US 11,413,720 B2
(45) Date of Patent: Aug. 16, 2022

(54) POLISHING APPARATUS

(71) Applicant: EBARA CORPORATION, Tokyo (JP)

(72) Inventors: Nobuyuki Takahashi, Tokyo (JP); Toshifumi Kimba, Tokyo (JP); Masaki Kinoshita, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 975 days.

(21) Appl. No.: 16/162,063

(22) Filed: Oct. 16, 2018

(65) Prior Publication Data

US 2019/0118331 A1    Apr. 25, 2019

(30) Foreign Application Priority Data

Oct. 19, 2017  (JP) .............................. JP2017-202848

(51) Int. Cl.

| | |
|---|---|
| *B24B 37/10* | (2012.01) |
| *B24B 37/013* | (2012.01) |
| *G01J 3/10* | (2006.01) |
| *G01J 3/42* | (2006.01) |
| *B24B 49/12* | (2006.01) |
| *G01N 21/95* | (2006.01) |
| *B24B 37/20* | (2012.01) |
| *G01J 3/02* | (2006.01) |

(52) U.S. Cl.
CPC ............ *B24B 37/013* (2013.01); *B24B 37/10* (2013.01); *B24B 37/107* (2013.01); *B24B 37/205* (2013.01); *B24B 49/12* (2013.01); *G01J 3/0218* (2013.01); *G01J 3/0291* (2013.01); *G01J 3/10* (2013.01); *G01J 3/42* (2013.01); *G01N 21/9501* (2013.01)

(58) Field of Classification Search
CPC ...... B24B 37/205; B24B 49/12; G01J 3/0218; G01J 3/10; G01B 11/0633; G01N 21/8422
USPC .............................. 356/504, 503, 497; 451/6
See application file for complete search history.

(56) References Cited

U.S. PATENT DOCUMENTS

| | | | |
|---|---|---|---|
| 7,119,908 B2 * | 10/2006 | Nomoto ................... | B24B 49/12 356/504 |
| 2008/0206993 A1 * | 8/2008 | Lee ......................... | B24B 49/12 438/692 |
| 2009/0036026 A1 | 2/2009 | David et al. | |
| 2010/0015889 A1 * | 1/2010 | Shimizu ............... | G05B 19/406 451/6 |
| 2010/0208487 A1 | 8/2010 | Li | |

(Continued)

FOREIGN PATENT DOCUMENTS

| | | |
|---|---|---|
| JP | 2006-040944 A | 2/2006 |
| JP | 2012-518279 A | 8/2012 |

(Continued)

*Primary Examiner* — Isiaka O Akanbi
(74) *Attorney, Agent, or Firm* — Bakerhostetler

(57) ABSTRACT

There is disclosed a polishing apparatus which allows for easy replacement of a light source with another type of light source. The light-source assembly includes: a base fixed to a polishing table and coupled to a light-emitting transmission line; and a light-source module having a lamp for emitting light. The light-source module is removably attached to the base. The base is a common base which is adapted to any of a plurality of light-source modules of different types including the light-source module. The base includes a positioning structure which achieves positioning of the light-source module relative to the base.

7 Claims, 9 Drawing Sheets

(56) References Cited

U.S. PATENT DOCUMENTS

| | | | |
|---|---|---|---|
| 2012/0164917 A1* | 6/2012 | Kobata | B24B 37/205 451/6 |
| 2012/0196511 A1* | 8/2012 | David | B24B 37/105 451/6 |
| 2013/0337586 A1* | 12/2013 | Iizumi | B24B 49/12 438/16 |
| 2014/0017824 A1* | 1/2014 | Iizumi | H01L 21/7684 438/16 |
| 2014/0206259 A1 | 7/2014 | Benvegnu et al. | |
| 2016/0354894 A1* | 12/2016 | Kimba | B24B 37/013 |
| 2017/0148655 A1* | 5/2017 | Kobayashi | B24B 49/105 |

FOREIGN PATENT DOCUMENTS

| | | |
|---|---|---|
| JP | 2013-526080 A | 6/2013 |
| JP | 2017-005014 A | 1/2017 |
| WO | WO 2011/139571 A2 | 11/2011 |
| WO | WO 2012/102541 A2 | 8/2012 |
| WO | WO 2017/159439 A1 | 9/2017 |

* cited by examiner

POLISHING APPARATUS

CROSS REFERENCE TO RELATED APPLICATION

This document claims priority to Japanese Patent Application Number 2017-202848 filed Oct. 19, 2017, the entire contents of which are hereby incorporated by reference.

BACKGROUND

Manufacturing processes of semiconductor devices include a process of polishing a dielectric film, e.g., $SiO_2$, and a process of polishing a metal film, e.g., copper or tungsten. Manufacturing processes of backside illumination CMOS sensor and through-silicon via (TSV) include a process of polishing a silicon layer (silicon wafer), in addition to the polishing processes of the dielectric film and the metal film. Polishing of a wafer is terminated when a thickness of a film (e.g., the dielectric film, the metal film, or the silicon layer), constituting a wafer surface, has reached a predetermined target value.

Polishing of a wafer is carried out using a polishing apparatus. In order to measure a film thickness of a non-metal film, such as a dielectric film or a silicon layer, the polishing apparatus generally includes an optical film-thickness measuring device. This optical film-thickness measuring device is configured to direct a light, which is emitted from a light source, to a surface of the wafer, measure intensity of reflected light from the wafer, and analyze a spectrum of the reflected light from the wafer to thereby measure the film thickness of the wafer.

In the optical film-thickness measuring device described above, light having wavelengths suitable for measuring a film thickness is used based on the kind of the film and/or the thickness of the film. For example, light having relatively long wavelengths is used when a thickness of a thin film is measured, while light having relatively short wavelengths is used when a thickness of a silicon layer is measured. In this way, by selecting light having appropriate wavelengths based on the kind of the film and/or the thickness of the film, the film thickness can be accurately measured.

Recently, film types and a measurement range of film thickness tend to be diversified, and as a result, the wavelength range for use in measuring a film thickness is becoming wider than in the past. However, there is no light source that can cover such a wide wavelength range. One possible solution is to provide a plurality of light sources having different wavelength ranges in the optical film-thickness measuring device. However, since a light source is disposed on a polishing table of a polishing apparatus, there may be no space large enough to arrange a plurality of light sources on the polishing table.

SUMMARY OF THE INVENTION

Therefore, according to an embodiment, there is provided a polishing apparatus which allows for easy replacement of a light source with another type of light source.

Embodiments, which will be described below, relate to a polishing apparatus for polishing a wafer having a film formed on a surface of the wafer, and more particularly to a polishing apparatus for polishing a wafer, while detecting a film thickness of the wafer by analyzing optical information contained in reflected light from the wafer.

In an embodiment, there is provided a polishing apparatus comprising: a polishing table for supporting a polishing pad; a polishing head configured to press a wafer against the polishing pad; a light-source assembly; a light-emitting transmission line having a distal end located at a predetermined position in the polishing table; a light-receiving transmission line having a distal end located at the predetermined position in the polishing table; a spectrometer coupled to the light-receiving transmission line, the spectrometer being configured to decompose reflected light, transmitted from the wafer through the light-receiving transmission line, in accordance with wavelength and measure intensity of the reflected light at each of wavelengths; and a processor configured to obtain information of a film of the wafer based on a spectral waveform indicating a relationship between intensity and wavelength of the reflected light, wherein the light-source assembly includes: a base fixed to the polishing table and coupled to the light-emitting transmission line; and a light-source module having a lamp for emitting light, the light-source module being removably attached to the base, the base is a common base which is adapted to any of a plurality of light-source modules of different types including the light-source module, and the base includes a positioning structure which achieves positioning of the light-source module relative to the base.

In an embodiment, the base has an optical path located therein, the optical path has an entrance facing the lamp, and the optical path has an exit coupled to the light-emitting transmission line.

In an embodiment, the light-source module has a lamp cover that covers the lamp, the base has a recess formed in an outer surface of the base, and the lamp cover is fitted into the recess.

In an embodiment, the positioning structure comprises a plurality of positioning pins or a plurality of positioning pins arranged around the entrance of the optical path.

In an embodiment, the base includes a power input line, a signal input line, a power output line, a signal output line, and a cable connector coupled to the power output line and the signal output line, and the light-source module includes a connector port which can be coupled to the cable connector.

In an embodiment, the base includes a hook, and the light-source module includes an engagement member located right above the hook.

In an embodiment, the light-source module comprises a first light-source module having a first lamp configured to emit light, the polishing apparatus further includes a second light-source module having a second lamp configured to emit light having a wavelength range different from that of the first lamp, and one of the first light-source module and the second light-source module is selectively attached to the base.

According to the above-described embodiments, it is possible to detach only the light-source module and attach another type of light-source module to the base, while the base remains fixed to the polishing table. Since the light-source module is lighter than the light-source assembly as a whole, the light-source module can be replaced easily.

Since the light-emitting transmission line is coupled to the base, there is no need to disconnect the light-emitting transmission line from the base when the light-source module is removed from the base. In particular, a worker can replace the light-source module without touching the light-emitting transmission line. Generally, the quantity of light transmitted from the light-source assembly to the polishing table varies depending greatly on a relative position between a connection end of the light-emitting transmission line and the light-source assembly. In other words, the relative position between the connection end of the light-emitting transmission line and the light-source assembly affects the film-thickness measurement accuracy. According to the above-described embodiments, the light-emitting transmission line is coupled to the base, and the base is fixed to the polishing table. Therefore, the position of the connection end of the light-emitting transmission line relative to the base is fixed at all times. Therefore, it is possible to replace the light-source module without changing the quantity of light.

DESCRIPTION OF EMBODIMENTS

Figure 1:
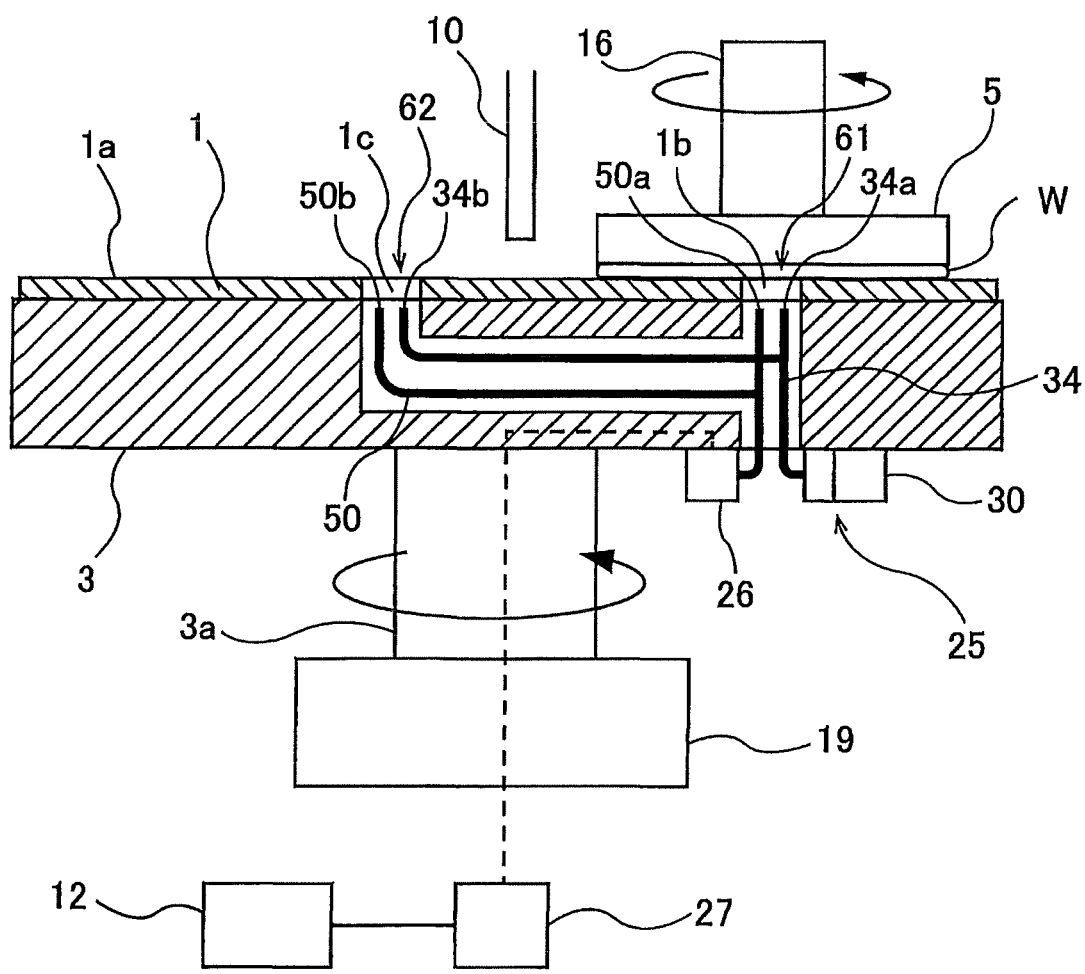
FIG. 1 is a view showing an embodiment of a polishing apparatus.

Embodiments will be described below with reference to the drawings. FIG. 1 is a view showing an embodiment of a polishing apparatus. As shown in FIG. 1, the polishing apparatus includes a polishing table 3 supporting a polishing pad 1, a polishing head 5 for holding a wafer W and pressing the wafer W against the polishing pad 1 on the polishing table 3, a polishing-liquid supply nozzle 10 for supplying a polishing liquid (e.g., slurry) onto the polishing pad 1, and a polishing controller 12 for controlling polishing of the wafer W.

The polishing table 3 is coupled to a table motor 19 through a table shaft 3a, so that the polishing table 3 is rotated by the table motor 19 in a direction indicated by arrow. The table motor 19 is located below the polishing table 3. The polishing pad 1 is attached to an upper surface of the polishing table 3. The polishing pad 1 has an upper surface, which provides a polishing surface 1a for polishing the wafer W. The polishing head 5 is secured to a lower end of a polishing head shaft 16. The polishing head 5 is configured to be able to hold the wafer W on its lower surface by vacuum suction. The polishing head shaft 16 can be elevated and lowered by an elevating mechanism (not shown in the drawing).

Polishing of the wafer W is performed as follows. The polishing head 5 and the polishing table 3 are rotated in directions indicated by arrows, while the polishing liquid (or slurry) is supplied from the polishing-liquid supply nozzle 10 onto the polishing pad 1. In this state, the polishing head 5 presses the wafer W against the polishing surface 1a of the polishing pad 1. The surface of the wafer W is polished by a chemical action of the polishing liquid and a mechanical action of abrasive grains contained in the polishing liquid.

The polishing apparatus includes an optical film-thickness measuring device (i.e., a film thickness measuring apparatus) 25 for measuring a film thickness of the wafer W. This optical film-thickness measuring device 25 includes a light-source assembly 30 for emitting light, an illuminating fiber 34 having distal ends 34a, 34b arranged at different locations in the polishing table 3, a light-receiving fiber 50 having distal ends 50a, 50b arranged at the different locations in the polishing table 3, a spectrometer 26 for decomposing reflected light, transmitted through the light-receiving fiber 50 from the wafer W, in accordance with wavelength and measuring an intensity of the reflected light at each of wavelengths, and a processor 27 for producing a spectral waveform indicating a relationship between the intensity and the wavelength of the reflected light. The processor 27 is coupled to the polishing controller 12. The illuminating fiber 34 is an example of a light-emitting transmission line, and the light-receiving fiber 50 is an example of a light-receiving transmission line.

The illuminating fiber 34 is coupled to the light-source assembly 30 and is arranged so as to direct the light, emitted by the light-source assembly 30, to the surface of the wafer W. The light-receiving fiber 50 is coupled to the spectrometer 26 and arranged so as to direct the reflected light from the surface of the wafer W to the spectrometer 26.

The distal end 34a of the illuminating fiber 34 and the distal end 50a of the light-receiving fiber 50 are adjacent to each other. These distal ends 34a, 50a constitute a first sensor head 61. The other distal end 34b of the illuminating fiber 34 and the other distal end 50b of the light-receiving fiber 50 are adjacent to each other. These distal ends 34b, 50b constitute a second sensor head 62. The polishing pad 1 has through-holes 1b, 1c located above the first sensor head 61 and the second sensor head 62, respectively. The first sensor head 61 and the second sensor head 62 can transmit the light to the wafer W on the polishing pad 1 through the through-holes 1b, 1c and can receive the reflected light from the wafer W through the through-holes 1b, 1c.

In one embodiment, the illuminating fiber 34 may have only one distal end arranged at a predetermined position in the polishing table 3, and the light-receiving fiber 50 may also have only one distal end arranged at the predetermined position in the polishing table 3. In this case also, the distal end of the illuminating fiber 34 and the distal end of the light-receiving fiber 50 are adjacent to each other. The distal end of the illuminating fiber 34 and the distal end of the light-receiving fiber 50 constitute a sensor head for transmitting the light to the wafer W on the polishing pad 1, and receiving the reflected light from the wafer W.

Figure 2:
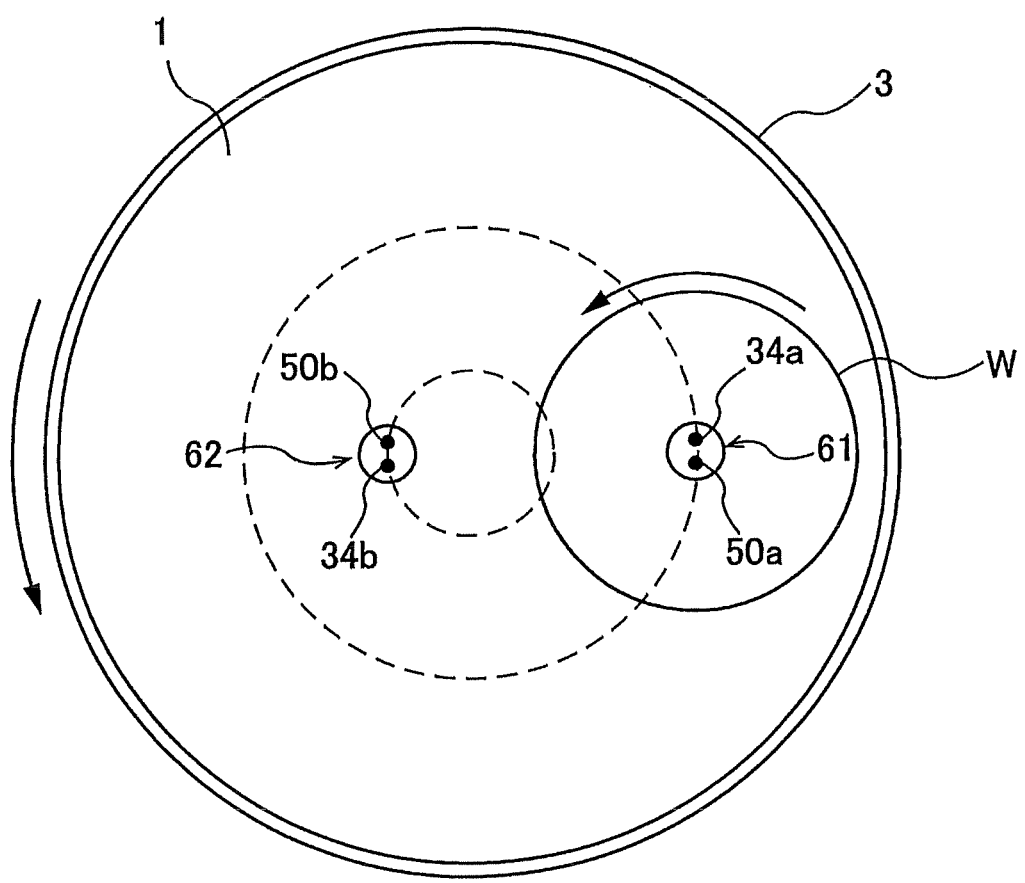
FIG. 2 is a plan view showing a polishing pad and a polishing table.

FIG. 2 is a plan view showing the polishing pad 1 and the polishing table 3. The first sensor head 61 and the second sensor head 62 are located at different distances from a center of the polishing table 3, and are arranged away from each other in the circumferential direction of the polishing pad 3. In the embodiment shown in FIG. 2, the second sensor head 62 is located across the center of the polishing table 3 from the first sensor head 61. The first sensor head 61 and the second sensor head 62 move across the wafer W alternately in different paths each time the polishing table 3 makes one revolution. More specifically, the first sensor head 61 sweeps across the center of the wafer W, while the second sensor head 62 sweeps across only the edge portion of the wafer W. The first sensor head 61 and the second sensor head 62 direct the light to the wafer W alternately, and receive the reflected light from the wafer W alternately.

Figure 3:
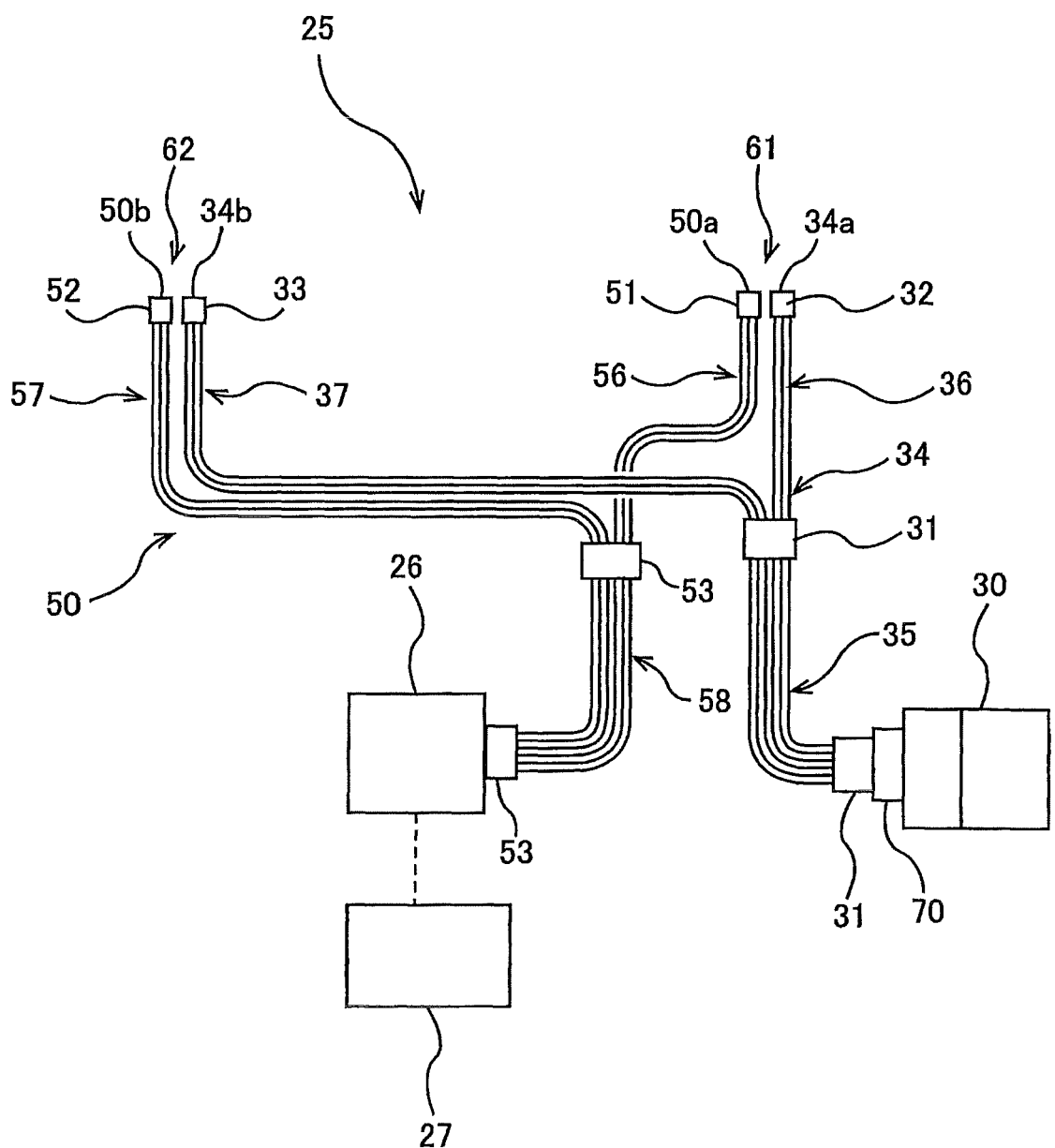
FIG. 3 is an enlarged view showing an optical film-thickness measuring device (film-thickness measuring apparatus)

FIG. 3 is an enlarged view showing the optical film-thickness measuring device (i.e., the film-thickness measuring apparatus) 25. The illuminating fiber 34 has a plurality of first illuminating strand optical fibers 36 and a plurality of second illuminating strand optical fibers 37. Distal ends of the first illuminating strand optical fibers 36 and distal ends of the second illuminating strand optical fibers 37 are bound by binders 32, 33, respectively. These distal ends constitute the distal ends 34a, 34b of the illuminating fiber 34.

Light-source-side ends of the first illuminating strand optical fibers 36, and light-source-side ends of the second illuminating strand optical fibers 37 are coupled to the light-source assembly 30. A part of the first illuminating strand optical fibers 36 and a part of the second illuminating strand optical fiber 37 are bundled by a binder 31 to constitute a trunk optical fiber 35. The end of the illuminating fiber 34, i.e., the end of the trunk optical fiber 35, is coupled to the light-source assembly 30 via a fiber connector 70. The other part of the first illuminating strand optical fibers 36 and the other part of the second illuminating strand optical fibers 37 constitute branch optical fibers branched off from the trunk optical fiber 35.

In the embodiment shown in FIG. 3, two branch optical fibers branch off from one trunk optical fiber 35. Three or more branch optical fibers can branch off by adding strand optical fibers. Further, a diameter of the fiber can be easily increased by adding strand optical fibers. Such an optical fiber constituted by the plurality of strand optical fibers has advantages that it can be easily bent and is not easily broken.

The light-receiving fiber 50 includes a plurality of first light-receiving strand optical fibers 56 bound by a binder 51, and a plurality of second light-receiving strand optical fibers 57 bound by a binder 52. The distal ends 50a, 50b of the light-receiving fiber 50 are constituted by distal ends of the first light-receiving strand optical fibers 56 and distal ends of the second light-receiving strand optical fibers 57, respectively. The distal end 34a of the first illuminating strand optical fibers 36 and the distal end 50a of the first light-receiving strand optical fibers 56 constitute the first sensor head 61. The distal end 34b of the second illuminating strand optical fibers 37 and the distal end 50b of the second light-receiving strand optical fibers 57 constitute the second sensor head 62. A part of the first light-receiving strand optical fibers 56 and a part of the second light-receiving strand optical fibers 57 are bundled by a binder 53 to constitute a trunk optical fiber 58. The trunk optical fiber 58 is coupled to the spectrometer 26. The spectrometer 26 is electrically connected to the processor 27.

In the present embodiment, the light-receiving strand optical fibers 56, 57 are coupled to the spectrometer 26. During polishing of the wafer W, light is transmitted to the spectrometer 26 through both the light-receiving strand optical fibers 56, 57. Since the intensity of light other than the light reflected from the wafer W is extremely low, accurate film thickness measurement can be achieved by using only light whose intensity is larger than a threshold value. In one embodiment, an optical switch for selectively coupling one of the light-receiving strand optical fibers 56, 57 to the spectrometer 26 may be disposed between the light-receiving strand optical fibers 56, 57 and the spectrometer 26.

During polishing of the wafer W, the illuminating fiber 34 directs the light to the wafer W, and the light-receiving fiber 50 receives the reflected light from the wafer W. The reflected light from the wafer W is transmitted through the light-receiving fiber 50 to the spectrometer 26. The spectrometer 26 decomposes the reflected light in accordance with wavelength, measures the intensity of the reflected light at each of the wavelengths over a predetermined wavelength range, and transmits light intensity data obtained to the processor 27. This light intensity data is an optical signal reflecting a film thickness of the wafer W, and contains the intensities of the reflected light and the corresponding wavelengths. The processor 27 produces, from the light intensity data, the spectral waveform representing the intensity of the light at each of the wavelengths.

Figure 4:
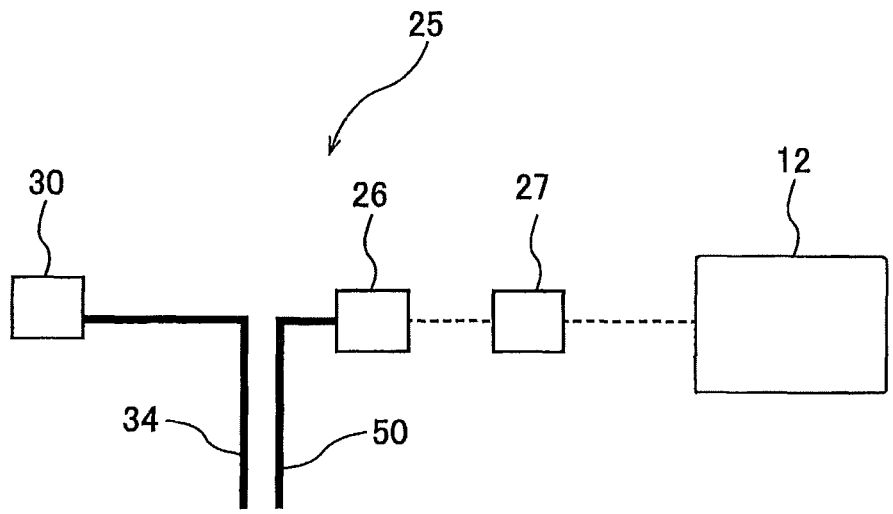
FIG. 4 is a schematic view illustrating the principle of the optical film-thickness measuring device.

FIG. 4 is a schematic view illustrating the principle of the optical film-thickness measuring device 25. In this example shown in FIG. 4, a wafer W has a lower film and an upper film formed on the lower film. The upper film is a film that can allow light to pass therethrough, such as a silicon layer or a dielectric film. The light, directed to the wafer W, is reflected off an interface between a medium (e.g., water in the example of FIG. 4) and the upper film and an interface between the upper film and the lower film. Light waves from these interfaces interfere with each other. The manner of interference between the light waves varies according to the thickness of the upper film (i.e., a length of an optical path). As a result, the spectral waveform, produced from the reflected light from the wafer W, varies according to the thickness of the upper film.

The spectrometer 26 decomposes the reflected light in accordance with the wavelength and measures the intensity of the reflected light at each of the wavelengths. The processor 27 produces the spectral waveform from the reflected-light intensity data (or optical signal) obtained by the spectrometer 26. This spectral waveform is expressed as a line graph indicating a relationship between the wavelength and the intensity of the light. The intensity of the light can also be expressed as a relative value, such as a relative reflectance which will be discussed later.

Figure 5:
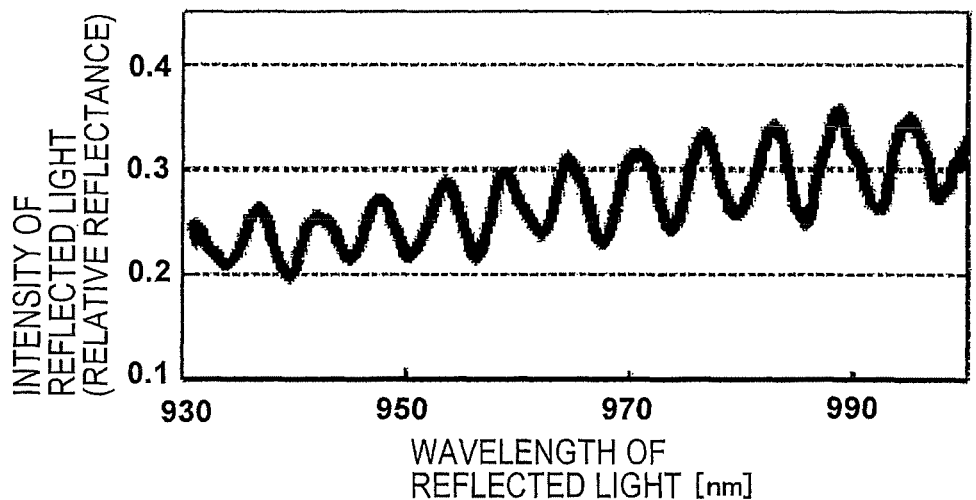
FIG. 5 is a graph showing an example of a spectral waveform.

FIG. 5 is a graph showing an example of the spectral waveform. In FIG. 5, vertical axis represents relative reflectance indicating the intensity of the reflected light from the wafer W, and horizontal axis represents wavelength of the reflected light. The relative reflectance is an index value that represents the intensity of the reflected light. The relative reflectance is a ratio of the intensity of the light to a predetermined reference intensity. By dividing the intensity of the light (i.e., the actually measured intensity) at each wavelength by a predetermined reference intensity, unwanted noises, such as a variation in the intensity inherent in an optical system or the light source of the apparatus, are removed from the actually measured intensity.

The reference intensity is an intensity that has been measured in advance at each of the wavelengths. The relative reflectance is calculated at each of the wavelengths. Specifically, the relative reflectance is determined by dividing the intensity of the light (the actually measured intensity) at each wavelength by the corresponding reference intensity. The reference intensity is, for example, obtained by directly measuring the intensity of light emitted from the first sensor head 61 or the second sensor head 62, or by irradiating a mirror with light from the first sensor head 61 or the second sensor head 62 and measuring the intensity of reflected light from the mirror. Alternatively, the reference intensity may be an intensity of the reflected light which is measured by the spectrometer 26 when a silicon wafer (bare wafer) with no film thereon is being water-polished in the presence of water, or when the silicon wafer (bare wafer) is placed on the polishing pad 1. In the actual polishing process, a dark level (which is a background intensity obtained under the condition that light is cut off) is subtracted from the actually measured intensity to determine a corrected actually measured intensity. Further, the dark level is subtracted from the reference intensity to determine a corrected reference intensity. Then the relative reflectance is calculated by dividing the corrected actually measured intensity by the corrected reference intensity. That is, the relative reflectance R(λ) can be calculated by using the following formula (1)

$$R(\lambda) = \frac{E(\lambda) - D(\lambda)}{B(\lambda) - D(\lambda)} \quad (1)$$

where λ is wavelength, E(λ) is the intensity of the light reflected from the wafer at the wavelength λ, B(λ) is the reference intensity at the wavelength λ, and D(λ) is the background intensity (i.e., dark level) at the wavelength λ obtained under the condition that light is cut off.

Figure 6:
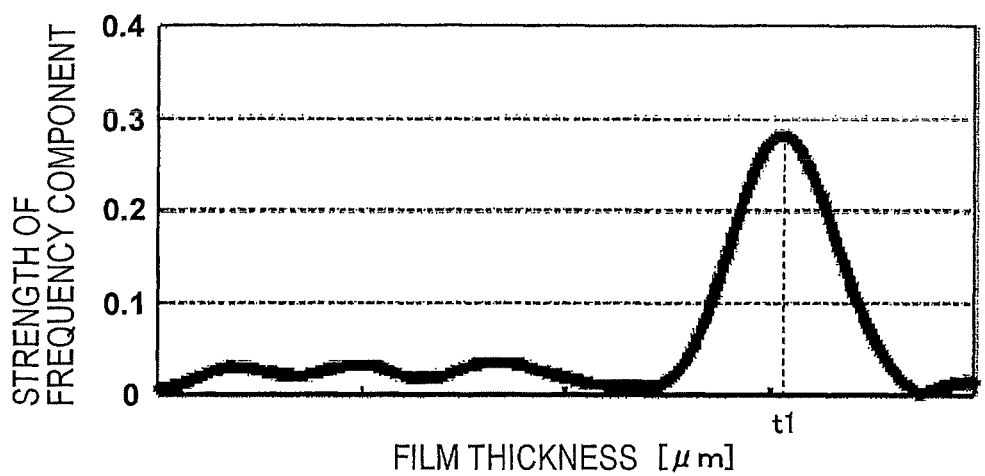
FIG. 6 is a graph showing a frequency spectrum obtained by performing Fourier transform process on the spectral waveform shown in FIG. 5.

The processor 27 performs a Fourier transform process (e.g., fast Fourier transform process) on the spectral waveform to produce a frequency spectrum and determines a film thickness of the wafer W from the frequency spectrum. FIG. 6 is a graph showing the frequency spectrum obtained by performing the Fourier transform process on the spectral waveform shown in FIG. 5. In FIG. 6, vertical axis represents strength of a frequency component contained in the spectral waveform, and horizontal axis represents film thickness. The strength of a frequency component corresponds to amplitude of a frequency component which is expressed as sine wave. A frequency component contained in the spectral waveform is converted into a film thickness with use of a predetermined relational expression, so that the frequency spectrum as shown in FIG. 6 is produced. This frequency spectrum represents a relationship between the film thickness and the strength of the frequency component. The above-mentioned predetermined relational expression is a linear function representing the film thickness and having the frequency component as variable. This linear function can be obtained from actual measurement results of film thickness, an optical film-thickness measurement simulation, theoretical formula, etc.

In the graph shown in FIG. 6, a peak of the strength of the frequency component appears at a film thickness t1. In other words, the strength of the frequency component becomes maximum at the film thickness of t1. That is, this frequency spectrum indicates that the film thickness is t1. In this manner, the processor 27 determines the film thickness corresponding to a peak of the strength of the frequency component. The processor 27 analyzes the optical information contained in the reflected light from the wafer W to thereby obtain film information, such as film thickness, film material, film quality, and the like.

The processor 27 outputs the film thickness t1 as a film-thickness measurement value to the polishing controller 12. The polishing controller 12 controls polishing operations (e.g., a polishing terminating operation) based on the film thickness t1 sent from the processor 27. For example, when the film thickness t1 has reached a preset target value, the polishing controller 12 terminates polishing of the wafer W.

Figure 7:
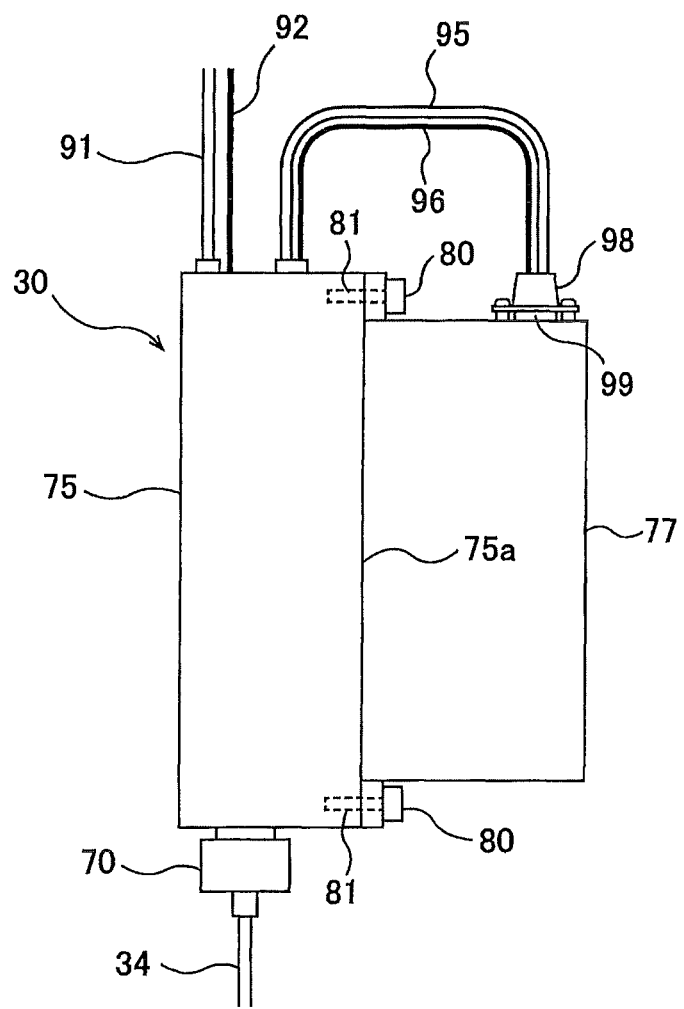
FIG. 7 is a bottom view of the light-source assembly.
Figure 8:
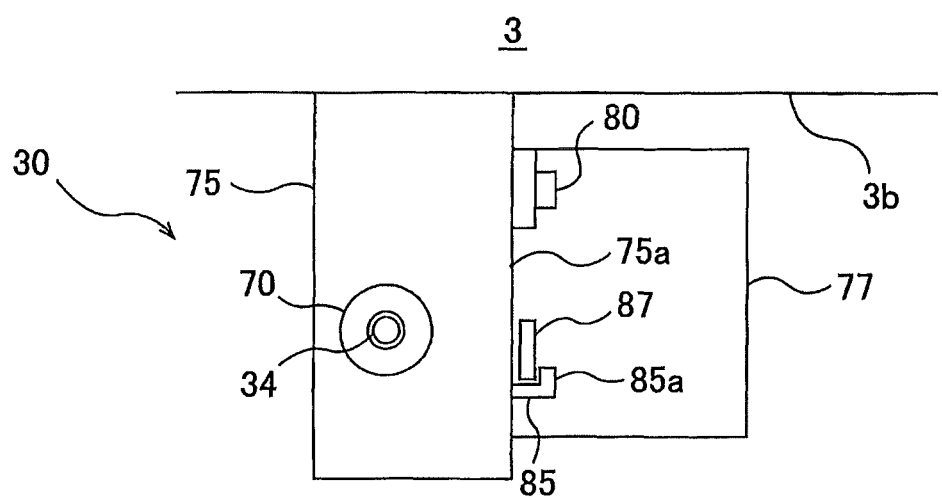
FIG. 8 is a side view of the light-source assembly.

FIG. 7 is a bottom view of the light-source assembly 30, and FIG. 8 is a side view of the light-source assembly 30. The light-source assembly 30 includes a base 75 fixed to the polishing table 3, and a light-source module 77 removably attached to the base 75. The illuminating fiber 34 is detachably coupled to the base 75 by a fiber connector 70. The base 75 is fixed to a lower surface 3b of the polishing table 3 by screws (not shown), whereas the light-source module 77 is not fixed to the polishing table 3. The light-source module 77 is attached to a module mount surface 75a of the base 75 by fastening screws 80. The fastening screws 80 are disposed on both sides of the light-source module 77. The base 75 has screw holes 81. The light-source module 77 is fixed to the base 75 by the fastening screws 80 screwed into the screw holes 81. By removing the fastening screws 80 from the screw holes 81, the light-source module 77 can be separated from the base 75.

In order to prevent the light-source module 77 from falling off from the base 75 when the fastening screws 80 are loosened, a hook 85 is fixed to the base 75, and the light-source module 77 is provided with an engagement member 87 located right above the hook 85. The engagement member 87 is fixed to the light-source module 77. The hook 85 has an end portion 85a extending upwardly. A lower end of the engagement member 87 is located lower than a top surface of the end portion 85a of the hook 85. In the event that the fastening screws 80 are loosened during the rotation of the polishing table 3, the engagement member 87 engages with the hook 85. The engagement of the hook 85 and the engagement member 87 can prevent the light-source module 77 from falling off from the base 75.

The base 75 includes a power input line 91, a signal input line 92, a power output line 95, a signal output line 96, and a cable connector 98 coupled to the power output line 95 and the signal output line 96. The cable connector 98 is detachably coupled to the connector port 99 of the light-source module 77. The power output line 95 and the signal output line 96 may be covered with a protective film (sheath). The power input line 91 is coupled to a power source (not shown). The signal input line 92 is coupled to the polishing controller 12 shown in FIG. 1, and transmits a trigger signal generated by the polishing controller 12 to the base 75. The power output line 95 is coupled to the power input line 91, and the signal output line 96 is coupled to the signal input line 92. The power supplied from the power source is delivered to the base 75 through the power input line 91, passes through the base 75, and is delivered to the light-source module 77 through the power output line 95. The trigger signal from the polishing controller 12 is transmitted to the base 75 through the signal input line 92, passes through the base 75, and delivered to the light-source module 77 through the signal output line 96.

Figure 9:
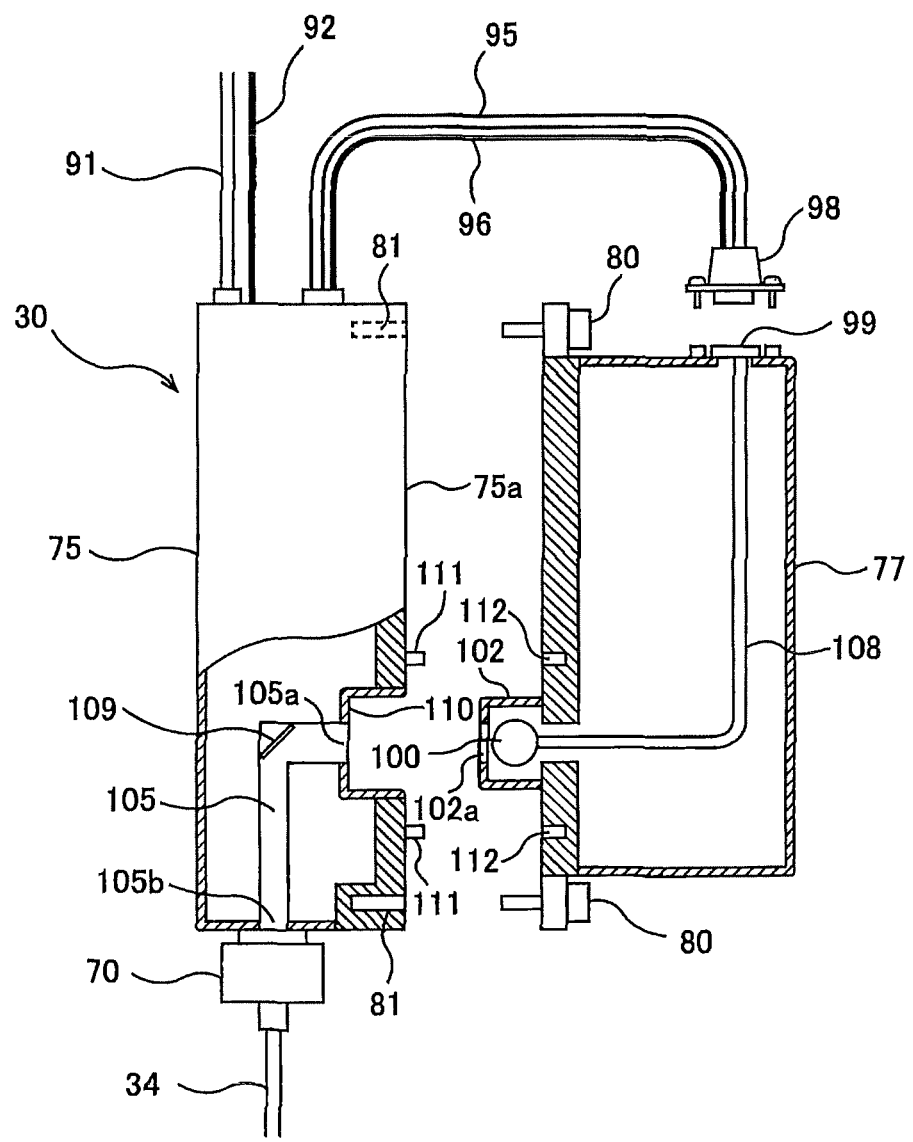
FIG. 9 is a view showing a state in which the light-source module is removed from the base.

FIG. 9 is a view showing a state in which the light-source module 77 is removed from the base 75. The light-source module 77 has a connector port 99 that can be coupled to the cable connector 98. As shown in FIG. 9, when the light-source module 77 is removed from the base 75, the cable connector 98 is disconnected from the connector port 99. When the light-source module 77 is attached to the base 75, the cable connector 98 is coupled to the connector port 99 as shown in FIG. 7.

As shown in FIG. 9, the light-source module 77 has a lamp 100 for emitting light and a lamp cover 102 covering the lamp 100. A through-hole 102a is formed in a front end surface of the lamp cover 102, so that the light emitted by the lamp 100 can pass through the through-hole 102a. A recess 110 into which the lamp cover 102 is fitted is formed in an outer surface of the base 75, more specifically in the module mount surface 75a. The light-source module 77 is attached to the module mount surface 75a. The base 75 has an optical path 105 located therein. An entrance 105a of the optical path 105 is located at the bottom of the recess 110, and an exit 105b of the optical path 105 is coupled to the illuminating fiber 34 by a fiber connector 70.

When the light-source module 77 is attached to the base 75, the lamp cover 102 is fitted into the recess 110, whereby the entrance 105a of the optical path 105 is shielded from light, and the entrance 105a of the optical path 105 faces the lamp 100. When the lamp 100 emits light with the lamp cover 102 fitted in the recess 110, the light travels through the optical path 105 to the illuminating fiber 34. The optical path 105 is provided with a reflection mirror 109 for changing the traveling direction of the light. In one embodiment, the optical path 105 may be comprised of optical fiber. The lamp 100 shown in FIG. 9 is a halogen lamp. The lamp 100 is electrically connected to the power output line 95 through an internal power line 108, so that the power is supplied to the lamp 100 through the power output line 95 and the internal power line 108.

The base 75 has a plurality of positioning pins 111 serving as a positioning structure for positioning the light-source module 77 relative to the base 75. This positioning pins 111 are fixed to the module mount surface 75a, and are arranged around the recess 110 and the entrance 105a of the optical path 105. The light-source module 77 has positioning holes 112 into which the positioning pins 111 are inserted. The positioning holes 112 are arranged around the lamp cover 102 and the lamp 100. When the light-source module 77 is attached to the base 75, the lamp cover 102 is fitted into the recess 110, and the positioning pins 111 are inserted into the positioning holes 112.

In one embodiment, the light-source module 77 may have positioning pins 111 and the base 75 may have positioning holes 112. In this case, the positioning pins 111 are arranged around the lamp cover 102 and the lamp 100, and the positioning holes 112 are arranged around the recess 110 and the entrance 105a of the optical path 105.

The base 75 is a common base that is adapted to any of a plurality of light-source modules of different types including the light-source module 77. These light-source modules of different types are prepared in advance and include the light-source module 77. According to this embodiment, it is possible to remove the light-source module 77 and attach a different type of light-source module to the base 75. For example, the light-source module 77 having a halogen lamp is removed from the base 75, and a light-source module having a xenon lamp can be attached to the base 75. A halogen lamp is generally capable of emitting light having wavelengths ranging from 400 nm to 1100 nm, and a xenon lamp can generally emit light having wavelengths ranging from 200 nm to 800 nm. Therefore, by selectively attaching the light-source module 77 having a halogen lamp or another light-source module having a xenon lamp to the base 75, the optical film-thickness measuring device 25 can cover the wavelength range of 200 nm to 1100 nm.

Figure 10:
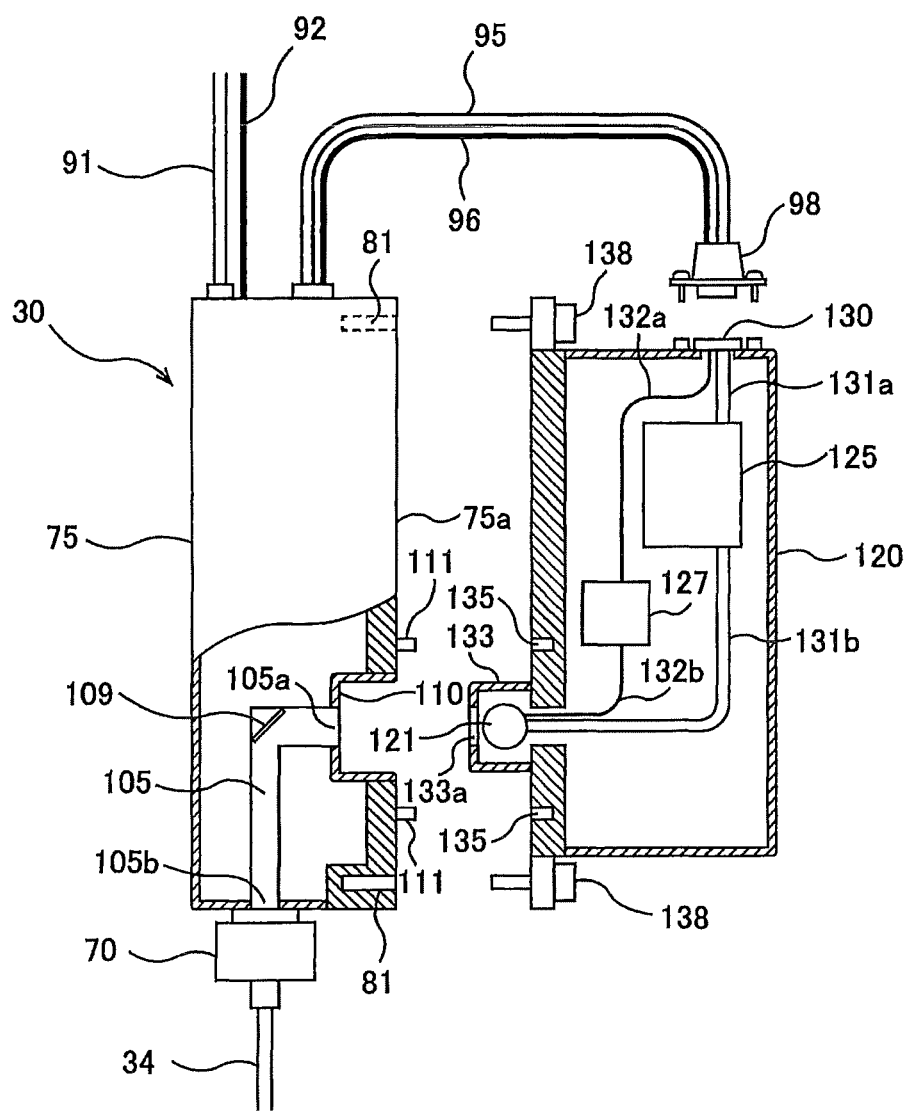
FIG. 10 is a view showing a light-source module of a type different from the light-source module shown in FIGS. 8 and 9.

FIG. 10 is a diagram showing a light-source module 120 of a type different from the light-source module 77 shown in FIGS. 8 and 9. The light-source module 120 has a lamp 121, a high-voltage power supply 125, and a trigger circuit 127 arranged therein. The lamp 121 is a lamp capable of emitting light with a wavelength range different from that of the lamp 100 of the light-source module 77. For example, the lamp 100 of the light-source module 77 is a halogen lamp, and the lamp 121 of the light-source module 120 is a xenon lamp. In the following description, the light-source module 77 will be referred to as first light-source module 77, the lamp 100 of the first light-source module 77 will be referred to as halogen lamp 100, the light-source module 120 will be referred to as second light-source module 120, and the lamp 121 of the second light-source module 120 is referred to as xenon lamp 121.

The high-voltage power supply 125 generates a high voltage and applies the generated high voltage to the xenon lamp 121. The trigger circuit 127 is configured to control application timing of the high voltage. The second light-source module 120 has a connector port 130 at the same position as the connector port 99 of the above-described first light-source module 77. The shape and size of the connector port 130 are the same as those of the connector port 99 of the first light-source module 77. Therefore, the cable connector 98 can be coupled to the connector port 130.

The connector port 130 is coupled to the high-voltage power supply 125 via a first internal power line 131a. The high-voltage power supply 125 is coupled to the xenon lamp 121 via a second internal power line 131b. Further, the connector port 130 is coupled to the trigger circuit 127 via a first internal signal line 132a, and the trigger circuit 127 is coupled to the xenon lamp 121 via a second internal signal line 132b. When the cable connector 98 is coupled to the connector port 130 of the second light-source module 120, the power output line 95 and the signal output line 96 are electrically connected to the first internal power line 131a and the first internal signal line 132a, respectively.

The second light-source module 120 has a lamp cover 133, positioning holes 135, an engagement member (not shown), and fastening screws 138 at the same positions as those of the first light-source module 77. A through-hole 133a is formed in a front end surface of the lamp cover 133, so that light, emitted by the xenon lamp 121, can pass through the through-hole 133a.

Figure 11:
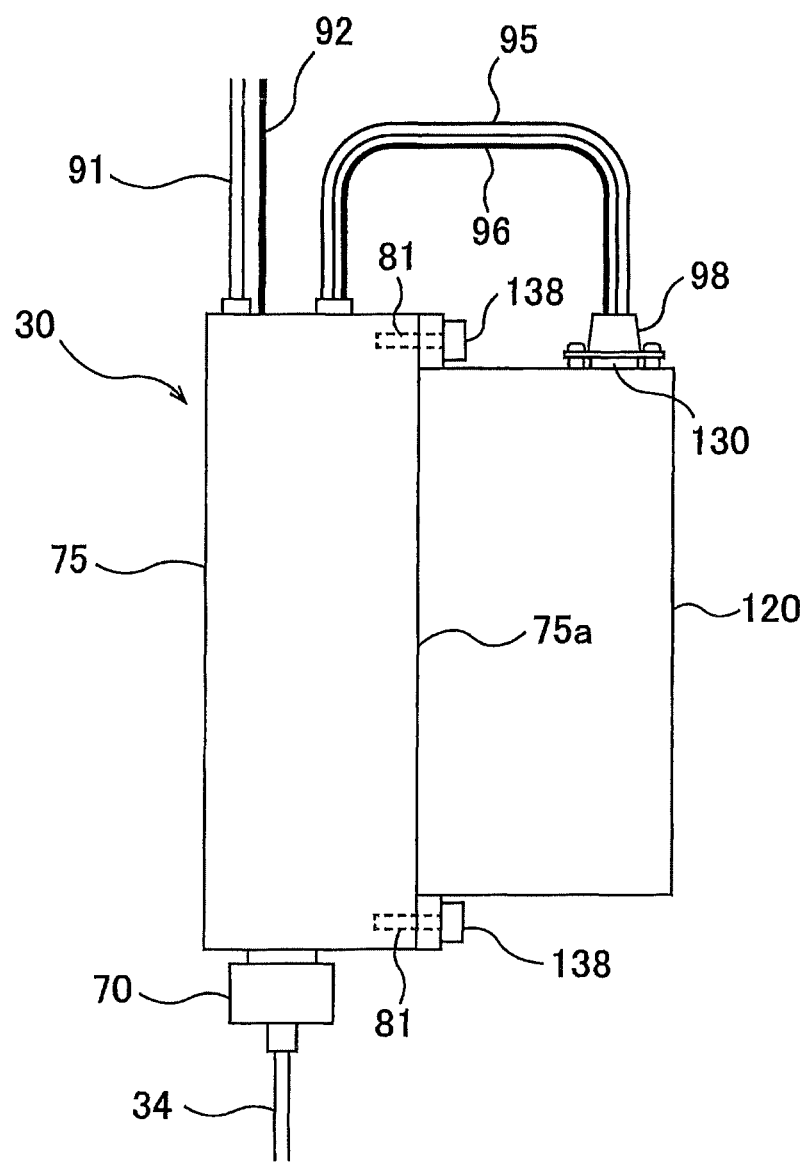
FIG. 11 is a view showing a state in which the light-source module shown in FIG. 10 is attached to the base.

The lamp cover 133, the positioning holes 135, the engagement member (not shown), and the fastening screws 138 of the second light-source module 120 have the same shapes as the lamp cover 102, the positioning holes 112, the engagement member 87, and the fastening screws 80 of the first light-source module 77. Therefore, as shown in FIG. 11, the second light-source module 120 can be attached to the module mount surface 75a of the base 75.

According to the present embodiment, it is possible to detach only the first light-source module 77 and attach the second light-source module 120 of another type to the base 75, while the base 75 remains fixed to the polishing table 3. Since the first light-source module 77 and the second light-source module 120 are lighter than the light-source assembly 30 as a whole, the first light-source module 77 can be easily replaced with the second light-source module 120. Similarly, it is also easy to replace the second light-source module 120 with the first light-source module 77.

Since the illuminating fiber 34 is coupled to the base 75, it is not necessary to separate the illuminating fiber 34 from the base 75 when the first light-source module 77 is removed from the base 75. In particular, a worker can replace the first light-source module 77 with the second light-source module 120 without touching the illuminating fiber 34. Generally, the quantity of light directed from the light-source assembly 30 to the polishing table 3 varies depending greatly on the relative position of the connection end of the illuminating fiber 34 and the light-source assembly 30. In other words, the relative position of the connection end of the illuminating fiber 34 and the light-source assembly 30 affects the film-thickness measurement accuracy. According to the present embodiment, the illuminating fiber 34 is coupled to the base 75, and the base 75 is fixed to the polishing table 3. Therefore, the position of the connection end of the illuminating fiber 34 relative to the base 75 is fixed at all times. Therefore, it is possible to replace the first light-source module 77 with the second light-source module 120 without changing the quantity of light. Similarly, it is also possible to replace the second light-source module 120 with the first light-source module 77 without changing the quantity of light.

In one embodiment, the first light-source module 77 and the second light-source module 120 are selected based on a process of a wafer. For example, when a silicon layer is to be polished, the first light-source module 77 having the halogen lamp 100 is used. When a thin film is to be polished, the second light-source module 120 having the xenon lamp 121 is used. In this way, an optimum type of light-source module can be used based on the type of film to be polished and/or the thickness of the film. Therefore, the polishing apparatus can be used for various polishing processes.

The types of the lamps 100, 121 of the light-source modules 77, 120 are not limited to halogen lamp and xenon lamp, and may be of other types such as light emitting diode, deuterium lamp, laser, and the like.

The above-discussed embodiments of the light-source assembly 30 including the base 75 and the light-source module 77 (or the light-source module 120) can be applied not only to the polishing apparatus shown in FIG. 1, but also to other polishing apparatuses. For example, although the polishing apparatus shown in FIG. 1 has two sensor heads 61, 62, the above embodiments of the light-source assembly 30 can also be applied to a polishing apparatus having only one sensor head.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A polishing apparatus comprising:
a polishing table for supporting a polishing pad;
a polishing head configured to press a wafer against the polishing pad;
a light-source assembly;
a light-emitting transmission line having a distal end located at a predetermined position in the polishing table;
a light-receiving transmission line having a distal end located at the predetermined position in the polishing table;
a spectrometer coupled to the light-receiving transmission line, the spectrometer being configured to decompose reflected light, transmitted from the wafer through the light-receiving transmission line, in accordance with wavelength and measure intensity of the reflected light at each of wavelengths; and
a processor configured to obtain information of a film of the wafer based on a spectral waveform indicating a relationship between intensity and wavelength of the reflected light,
wherein the light-source assembly includes:
a base fixed to the polishing table and coupled to the light-emitting transmission line; and
a light-source module having a lamp for emitting light, the light-source module being removably attached to the base,
the base is a common base which is adapted to any of a plurality of light-source modules of different types including the light-source module, and
the base includes a positioning structure which achieves positioning of the light-source module relative to the base.

2. The polishing apparatus according to claim 1, wherein the base has an optical path located therein, the optical path has an entrance facing the lamp, and the optical path has an exit coupled to the light-emitting transmission line.

3. The polishing apparatus according to claim 2, wherein the light-source module has a lamp cover that covers the lamp, the base has a recess formed in an outer surface of the base, and the lamp cover is fitted into the recess.

4. The polishing apparatus according to claim 2, wherein the positioning structure comprises a plurality of positioning pins or a plurality of positioning pins arranged around the entrance of the optical path.

5. The polishing apparatus according to claim 1, wherein:
the base includes a power input line, a signal input line, a power output line, a signal output line, and a cable connector coupled to the power output line and the signal output line, and
the light-source module includes a connector port which can be coupled to the cable connector.

6. The polishing apparatus according to claim 1, wherein:
the base includes a hook; and
the light-source module includes an engagement member located right above the hook.

7. The polishing apparatus according to claim 1, wherein:
the light-source module comprises a first light-source module having a first lamp configured to emit light;
the polishing apparatus further includes a second light-source module having a second lamp configured to emit light having a wavelength range different from that of the first lamp; and
one of the first light-source module and the second light-source module is selectively attached to the base.

* * * * *